(12) United States Patent
Armstrong

(10) Patent No.: US 10,527,290 B2
(45) Date of Patent: Jan. 7, 2020

(54) OVEN APPLIANCE AND METHODS OF OPERATION

(71) Applicant: Haier US Appliance Solutions, Inc., Wilmington, DE (US)

(72) Inventor: James Lee Armstrong, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 321 days.

(21) Appl. No.: 15/417,269

(22) Filed: Jan. 27, 2017

(65) Prior Publication Data
US 2018/0216831 A1     Aug. 2, 2018

(51) Int. Cl.
   *A21B 1/00* (2006.01)
   *F24C 7/08* (2006.01)
(52) U.S. Cl.
   CPC .................................. *F24C 7/087* (2013.01)
(58) Field of Classification Search
   CPC ... A47J 37/0623–0641; A21B 1/00–02; A21B 1/24; A21B 1/40; H05B 3/68; H05B 6/06–062; H05B 6/12; F24C 7/08–085
   See application file for complete search history.

(56) References Cited

U.S. PATENT DOCUMENTS

| | | | | |
|---|---|---|---|---|
| 4,340,796 A * | 7/1982 | Yamaguchi | ............ | G01K 1/024 219/516 |
| 4,377,733 A * | 3/1983 | Yamaguchi | ............ | G01K 1/024 219/516 |
| 4,460,814 A * | 7/1984 | Diesch | ................. | H05B 6/6452 219/725 |
| 4,475,024 A * | 10/1984 | Tateda | ................... | G01K 1/024 219/713 |
| 6,698,923 B2 * | 3/2004 | Bedetti | ................... | A47J 43/28 374/149 |
| 7,075,442 B2 * | 7/2006 | Lion | ..................... | G01K 1/024 340/540 |
| 7,183,521 B2 * | 2/2007 | Fisher | ...................... | F24C 7/08 126/333 |
| 8,188,409 B2 * | 5/2012 | Baier | ..................... | G01K 1/024 219/213 |
| 8,398,303 B2 * | 3/2013 | Kuhn | ..................... | G01K 1/024 219/712 |
| 10,088,371 B2 * | 10/2018 | Kaiser | ..................... | A47J 27/62 |

(Continued)

*Primary Examiner* — Michael A Laflame, Jr.
(74) *Attorney, Agent, or Firm* — Dority & Manning, P.A.

(57) ABSTRACT

An oven appliance and method of operation are provided herein. The oven appliance may include a cabinet defining an oven cavity, a heat source disposed within the oven cavity, an acoustic wave reader, a surface acoustic wave (SAW) temperature sensor receivable within the oven cavity, and a controller in operable communication with the acoustic wave reader. The controller may be configured to initiate a sensor protection sequence. The sensor protection sequence may include initiating a preset oven cycle of the heat source, and monitoring the oven cavity for a condition signal in response to the initiated oven cycle. The sensor protection sequence may further include determining a state of the SAW temperature sensor based on the monitoring, and halting the preset oven cycle based on a determined cavity-enclosed state of the SAW temperature sensor within the oven cavity.

12 Claims, 5 Drawing Sheets

(56) References Cited

U.S. PATENT DOCUMENTS

| | | | | |
|---|---|---|---|---|
| 2003/0010776 | A1* | 1/2003 | Kang | H05B 6/68 |
| | | | | 219/702 |
| 2006/0156763 | A1* | 7/2006 | Vecchi | D06F 19/00 |
| | | | | 68/3 SS |
| 2006/0219705 | A1* | 10/2006 | Beier | G01D 5/48 |
| | | | | 219/627 |
| 2009/0178664 | A1* | 7/2009 | Valentine | A47J 37/042 |
| | | | | 126/21 A |
| 2014/0098835 | A1* | 4/2014 | Herzog | G01K 11/265 |
| | | | | 374/117 |
| 2016/0238459 | A1* | 8/2016 | Koetz | G01K 1/024 |
| 2018/0070756 | A1* | 3/2018 | Vengroff | A23L 5/10 |

* cited by examiner

OVEN APPLIANCE AND METHODS OF OPERATION

FIELD OF THE INVENTION

The present subject matter relates generally to cooking appliances, and more particularly to oven appliances having one or more sensor assemblies for affecting operation of an oven appliance.

BACKGROUND OF THE INVENTION

Conventional residential and commercial oven appliances generally include a cabinet that defines a cooking chamber for receipt of food items for cooking. Heating elements are positioned within the cooking chamber to provide heat to food items located therein. The heating elements can include, for example, radiant heating elements, such as a bake heating assembly positioned at a bottom of the cooking chamber and/or a broil heating assembly positioned at a top of the cooking chamber.

When cooking certain food items, it may be important to check or monitor the temperature of the food item, e.g., in order to ensure the food item is adequately cooked. In some instances, a temperature probe may be provided. For example, the temperature probe may be inserted into the food item to provide a measurement of the food item's temperature. Although such probes may accurately detect temperature, they risk becoming damaged if exposed to excessive surrounding temperatures. Specifically, the electronic components of some temperature probes may be irreparably damaged if heated to over 250° Celsius (C.). It is possible for such damage to occur if the temperature probe is left in or on a food item after the food item is placed into the cooking chamber of an oven. Due, at least in part, to the relatively small size of most temperature probe, it is possible for a temperature probe to accidentally fall or be inserted into an oven chamber during a high-heat, non-cooking operation, such as a self-cleaning operation. The risk of damage to the temperature probe may be especially problematic if the temperature probe includes a battery.

Accordingly, an appliance and method for detecting temperature of a food item without the use of a battery-powered temperature probe would be useful. More specifically, an appliance and method for use with a temperature probe preventing high-heat damage to a temperature probe would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a method of operating an oven appliance is provided. The method may include initiating a preset oven cycle, and monitoring an oven cavity for a condition signal in response to the initiated oven cycle, wherein the condition signal is transmitted from a SAW temperature sensor to an acoustic wave reader. The method may also include determining a state of the SAW temperature sensor based on the monitoring, and halting the preset oven cycle based on a determined cavity-enclosed state of the SAW temperature sensor within the oven cavity.

In other aspect of the present disclosure, an oven appliance is provided. The oven appliance may include a cabinet defining an oven cavity, a heat source disposed within the oven cavity, an acoustic wave reader in communication with the oven cavity, a surface acoustic wave (SAW) temperature sensor receivable within the oven cavity, and a controller in operable communication with the acoustic wave reader. The controller may be configured to initiate a sensor protection sequence. The sensor protection sequence may include initiating a preset oven cycle of the heat source, and monitoring the oven cavity for a condition signal in response to the initiated oven cycle, wherein the condition signal is transmitted from the SAW temperature sensor to the acoustic wave reader. The sensor protection sequence may further include determining a state of the SAW temperature sensor based on the monitoring, and halting the preset oven cycle based on a determined cavity-enclosed state of the SAW temperature sensor within the oven cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
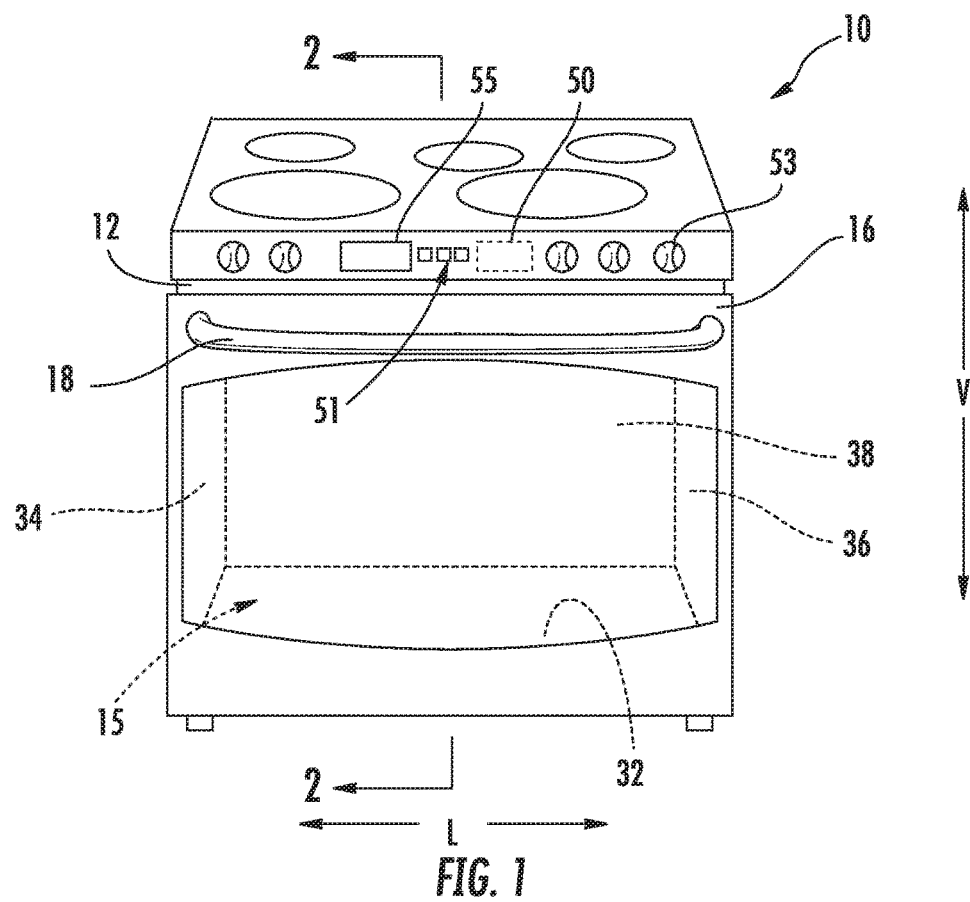
FIG. 1 provides a front perspective view of an oven appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, an oven appliance that defines an oven chamber and includes a temperature sensor is provided in some aspects of the present disclosure. The temperature sensor may be a surface acoustic wave (SAW) temperature sensor that can wirelessly communicate with a controller of the oven appliance. An acoustic wave reader may be provided to receive signals from the SAW temperature sensor. The appliance may be configured to prevent the oven chamber from heating if the temperature sensor is positioned within the oven chamber during certain operations or conditions.

Figure 2:
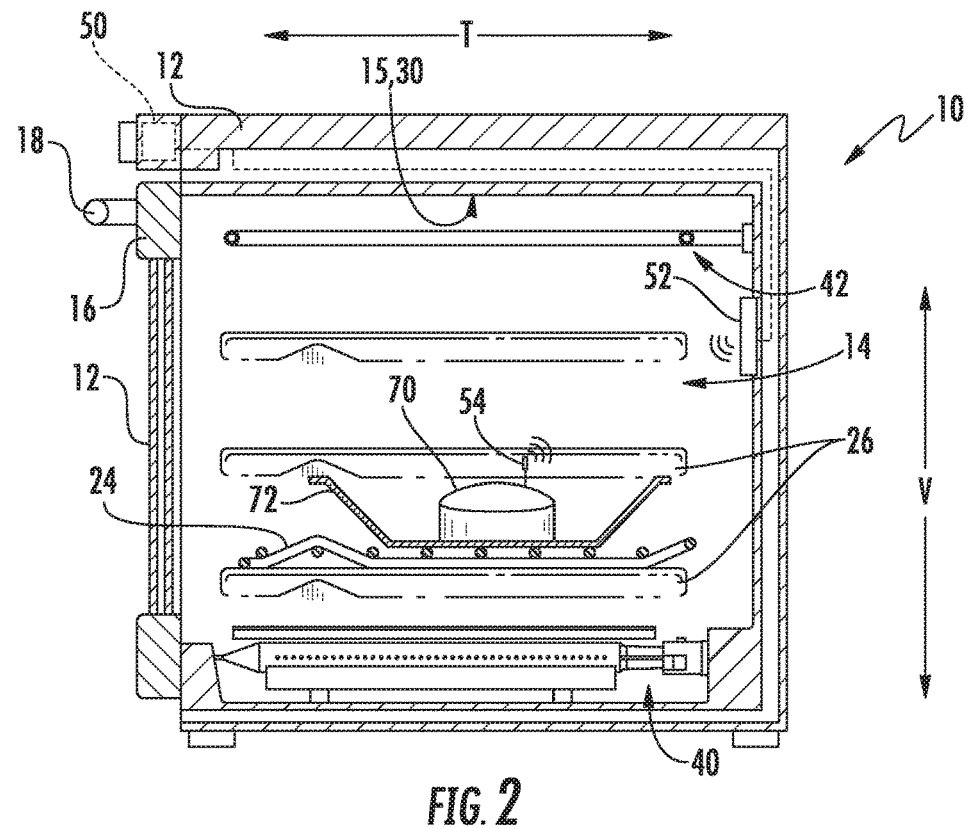
FIG. 2 provides a cross-sectional view of the example oven appliance of FIG. 1 taken along the line 2-2 of FIG. 1, wherein a temperature sensor is in a cavity-enclosed state.

Turning now to the figures, FIG. 1 provides a front perspective view of an example oven appliance 10. FIG. 2 provides a cross-sectional view of oven appliance 10 taken along the line 2-2 of FIG. 1. Oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable oven appliance 10. Thus, the present subject matter may be used with other oven or range appliance 10 configurations, e.g., that define multiple interior cavities for the receipt of food and/or having different configuration than what is shown in FIG. 2.

Oven appliance 10 includes an insulated cabinet 12 that defines an oven cavity, such as a cooking chamber 14. Cooking chamber 14 may be defined by an interior surface 15 of cabinet 12. Cooking chamber 14 is configured for the receipt of one or more food items (e.g., food item 70) to be cooked. Oven appliance 10 includes a door 16 rotatably mounted to cabinet 12, e.g., with a hinge (not shown). A handle 18 is mounted to door 16 and assists a user with opening and closing door 16 in order to access opening 20 to cooking chamber 14. For example, a user can pull on handle 18 to open or close door 16 and access cooking chamber 14 through opening 20.

Oven appliance 10 can includes a seal (not shown) between door 16 and cabinet 12 that assist with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of one or more food items (e.g., food item 70) and/or utensils (e.g., utensil 72) containing food items. Baking rack 24 is slidably received onto embossed ribs 26 or sliding rails such that rack 24 may be conveniently moved into and out of cooking chamber 14 when door 16 is open.

As shown, various sidewalls define the cooking chamber 14. For example, cooking chamber 14 includes a top wall 30 and a bottom wall 32 which are spaced apart along the vertical direction V. Left sidewall 34 and right sidewall 36 (as defined according to a front view as shown in FIG. 1) extend between the top wall 30 and bottom wall 32, and are spaced apart along the lateral direction L. A rear wall 38 additionally extends between the top wall 30 and bottom wall 32 as well as between the left sidewall 34 and right sidewall 36, and is spaced apart from the door 16 along the transverse direction T. Cooking chamber 14 is thus defined between the top wall 30, bottom wall 32, left sidewall 34, right sidewall 36, and rear wall 38.

In some embodiments, a gas fueled or electric bottom heating element 40 (e.g., a gas burner or a bake gas burner) is positioned in cabinet 12, e.g., at a bottom portion of cabinet 12. Bottom heating element 40 may be used to heat cooking chamber 14 for both cooking and cleaning of oven appliance 10. The size and heat output of bottom heating element 40 can be selected based on the e.g., the size of oven appliance 10.

In optional embodiments, a top heating element 42 is positioned in cooking chamber 14 of cabinet 12, e.g., at a top portion of cabinet 12. Top heating element 42 is used to heat cooking chamber 14 for both cooking/broiling and cleaning of oven appliance 10. Like bottom heating element 40, the size and heat output of top heating element 42 can be selected based on the e.g., the size of oven appliance 10. In the example embodiment shown in FIG. 2, top heating element 42 is shown as an electric resistance heating element. However, in alternative embodiments, a gas, microwave, halogen, or any other suitable heating element may be used instead of electric resistance heating element 42.

Oven appliance 10 may further include a controller 50, e.g., configured to control one or more operations of the oven appliance 10. For example, controller 50 may control at least one operation of oven appliance 10 that includes one or more of heating elements 40 and 42. Controller 50 may be in communication (via for example a suitable wired or wireless connection) with the heating element 40, heating element 42, user interface panel 51, acoustic wave reader 52, and other suitable components of the oven appliance 10, as discussed herein. In general, controller 50 may be operable to configure the oven appliance 10 (and various components thereof) for cooking. Such configuration may be based, for instance, on a plurality of cooking factors of a selected operating cycle or mode, e.g., as selected at user interface panel 51.

By way of example, controller 50 may include one or more memory devices and one or more microprocessors, such as general or special purpose microprocessors operable to execute programming instructions or micro-control code associated with an operating cycle. The memory device (i.e., memory) may represent random access memory such as DRAM, or read only memory such as ROM or FLASH. In one embodiment, the processor executes programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the processing device to perform operations. For certain embodiments, the instructions include a software package configured to operate appliance 10 and initiate one or more predetermined sequences (e.g., sensor protection sequences). For example, the instructions may include a software package configured to execute the example methods 500, 600, 700 described below with reference to FIGS. 5 through 7.

Figure 3:
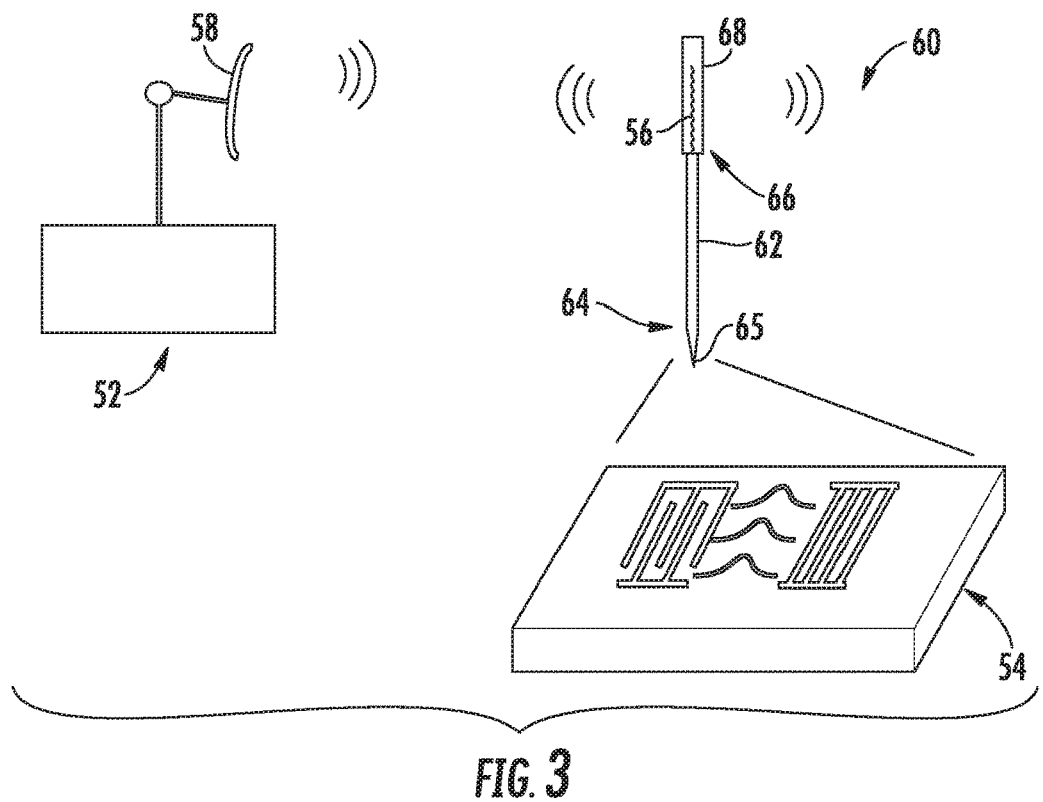
FIG. 3 provides a schematic view of a sensor assembly of a range appliance according to example embodiments of the present disclosure.

Controller 50 may be positioned in a variety of locations throughout oven appliance 10. As illustrated, controller 50 may be located within a user interface panel 51 of oven appliance 10 as shown in FIGS. 1 through 3. In some such embodiments, input/output ("I/O") signals may be routed between controller 50 and various operational components of oven appliance 10, such as heating element 40, heating element 42, acoustic wave reader 52, controls 53, display component 55, sensors, alarms, and/or other components as may be provided. For instance, signals may be directed along one or more wiring harnesses that may be routed through cabinet 12.

In some embodiments, user interface panel 51 includes input components or controls 53, such as one or more of a variety of electrical, mechanical or electro-mechanical input devices. Controls 53 may include rotary dials, push buttons, and touch pads. Controller 50 is in communication with user interface panel 51 and controls 53 through which a user may select various operational features and modes and monitor progress of oven appliance 10. In additional or alternative embodiments, user interface panel 51 includes a display component 55, such as a digital or analog display in communication with controller 50 and configured to provide operational feedback to a user. In certain embodiments, user interface panel 51 represents a general purpose I/O ("GPIO") device or functional block.

As illustrated, an acoustic wave reader 52 is provided to communicate with one or more other portion of appliance 10. For instance, the acoustic wave reader 52 may be disposed within the cabinet 12 in communication with cooking chamber 14. During use, acoustic wave reader 52 may monitor cooking chamber 14. During use, at least a portion of acoustic wave reader 52 may be disposed within, or extend into, cooking chamber 14. The acoustic wave reader 52 may be in communication with the controller 50, e.g., via one or more conductive wires or busses electrically coupling acoustic wave reader 52 to controller 50. When assembled, acoustic wave reader 52 may be operable to communicate (e.g., wirelessly) with one or more temperatures sensors to receive one or more signals therefrom. As will be described in more detail below, controller 50 may be configured to automatically control a heat output of one or more heating elements 40, 42 based on signal(s) received from acoustic wave reader 52.

Figure 4:
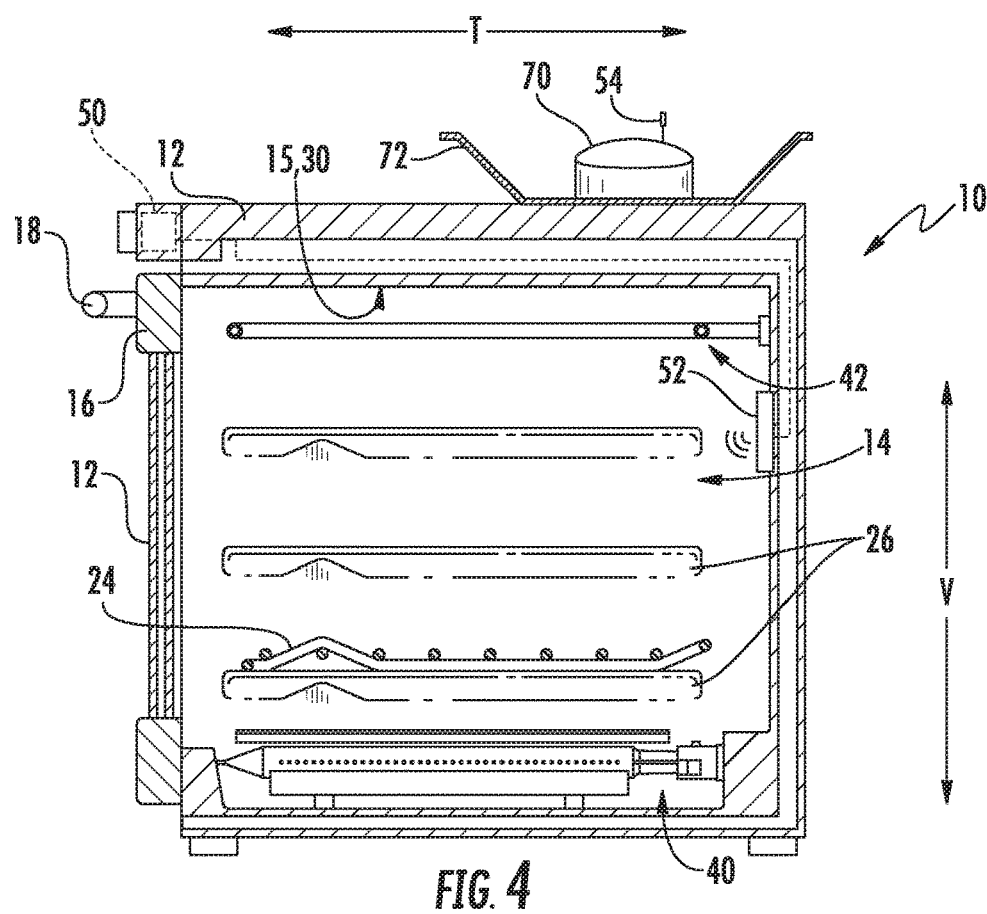
FIG. 4 provides a cross-sectional view of the example oven appliance of FIG. 2, wherein the temperature sensor is in a cavity-absent state.

As illustrated in FIGS. 2 through 4, a surface acoustic wave (SAW) temperature sensor 54 is provided in some embodiments. SAW temperature sensor 54 may be configured to detect changes in temperature, e.g., through strain deformation induced by heat at SAW temperature sensor 54. SAW temperature sensor 54 is generally configured for operable communication with acoustic wave reader 52. For instance, a pair of coupled antennas 56, 58 may be provided. A sensor antenna 56 may be electrically coupled to SAW temperature sensor 54. A reader antenna 58 may be electrically coupled to acoustic wave reader 52. Together or in isolation, sensor antenna 56 and reader antenna 58 may permit or provide communication, e.g., wireless communication, between SAW temperature sensor 54 and acoustic wave reader 52.

During operation, SAW temperature sensor 54 may selectively receive and/or transmit signals from acoustic wave reader 52. For instance, an interrogation signal, e.g., electromagnetic pulse, may be transmitted from acoustic wave reader 52 at reader antenna 58. The interrogation signal may be received at sensor antenna 56 and converted into a surface acoustic wave on SAW temperature sensor 54. Characteristics of the surface acoustic wave (e.g., frequency) may be varied according to the temperature detected at the SAW temperature sensor 54. A condition signal, e.g., a temperature signal, may be transmitted from the SAW temperature sensor 54 in response to the received interrogation signal. The condition signal may be received at acoustic wave reader 52. The condition signal may reflect the characteristics of the surface acoustic wave that was induced by the interrogation signal. Moreover, the condition signal may reflect changes or conditions at the SAW temperature sensor 54. Once received, the condition signal may be interpreted as temperature data (e.g., sensed values) and/or transmitted to controller 50. Advantageously, conversion of the interrogation signal and transmission of the condition signal may be performed without the use of an on-board power source or battery at the SAW temperature sensor 54.

Some embodiments of SAW temperature sensor 54 are housed within a portable food probe 60. For instance, SAW temperature sensor 54 may be embedded within one end portion 64 of food probe 60. Generally, food probe 60 may be provided as a narrow conductive shaft 62 having a sharpened tip 65 extending from the end portion 64 for insertion into a liquid or food item 70. A handle 68 may be attached to food probe 60, e.g., at an opposite end portion 66. In some such embodiments, sensor antenna 56 is housed within handle 68. Food probe 60 may extend into handle 68 and electrically couple SAW temperature sensor 54 to sensor antenna 56. Additionally or alternatively, a conductive wire or bus may electrically couple SAW temperature sensor 54 to sensor antenna 56.

Although FIG. 3 illustrates SAW temperature sensor 54 within food probe 60, additional or alternative embodiments of SAW temperature sensor 54 may directly engage a utensil 72. For instance, SAW temperature sensor 54 may be disposed on a utensil 72 in conductive thermal engagement therewith. When utensil 72 is placed within cooking chamber 14, heat may be conducted from a portion (e.g., a wall) of utensil 72 to SAW temperature sensor 54. Some embodiments may include a clip, mated groove, or another mechanical attachment mechanism to selectively attach SAW temperature sensor 54 to utensil 72. Alternatively, temperature sensor 54 may be embedded within a utensil 72, e.g., in a wall thereof.

As shown in FIGS. 2 and 4, SAW temperature sensor 54 may be a generally mobile element that can be inserted into (i.e., received by) cooking chamber 14. In turn, SAW temperature sensor 54 may be movable between a cavity-enclosed state (FIG. 2) and a cavity-absent state (FIG. 4). In the cavity-enclosed state, SAW temperature sensor 54 is disposed within cooking chamber 14. Acoustic wave reader 52 may thus communicate with SAW temperature sensor 54. By contrast, in the cavity-absent state, SAW temperature sensor 54 is disposed outside of cooking chamber 14. Signals between acoustic wave reader 52 and SAW temperature sensor 54 are generally blocked, e.g., by interior wall 15, door 16, and/or other portions of cabinet 12. Thus, direct communication is unavailable between acoustic wave reader 52 and SAW temperature sensor 54.

In some embodiments, controller 50 is configured to determine whether SAW temperature sensor 54 is in the cavity-enclosed state or the cavity-absent state based, at least in part, signals transmitted between acoustic wave reader 52 and SAW temperature sensor 54. For instance, reception of a condition signal at acoustic wave reader 52 may indicate the cavity-enclosed state. Failure to receive a condition signal after transmission of an interrogation signal (e.g., within a set amount of subsequent time) may indicate the cavity-absent state. In certain embodiments, controller 50 is operable to halt oven operation (e.g., turn off heating element(s) 40 and/or 42) if SAW temperature sensor 54 is in cooking chamber 14. For instance, controller 50 may turn off both heating element 40 and heating element 42 in response to cavity-enclosed state. Additionally or alternatively, an audible and/or visible alarm (e.g., at user interface 51) may be activated to alert a user upon determination that SAW temperature sensor 54 is in cooking chamber 14. Advantageously, SAW temperature sensor 54 may be protected and prevented from excessive heat or temperature exposure.

In additional or alternative embodiments, controller 50 is configured to determine other states of SAW temperature sensor 54. As an example, controller 50 may determine that SAW temperature sensor 54 has entered, or is in, a high-temperature state. In some such embodiments, a condition signal received by acoustic wave reader 52 may indicate SAW temperature sensor 54 has exceeded a predetermined temperature limit. Optionally, the predetermined temperature limit may be 250° Celsius.

Figure 5:
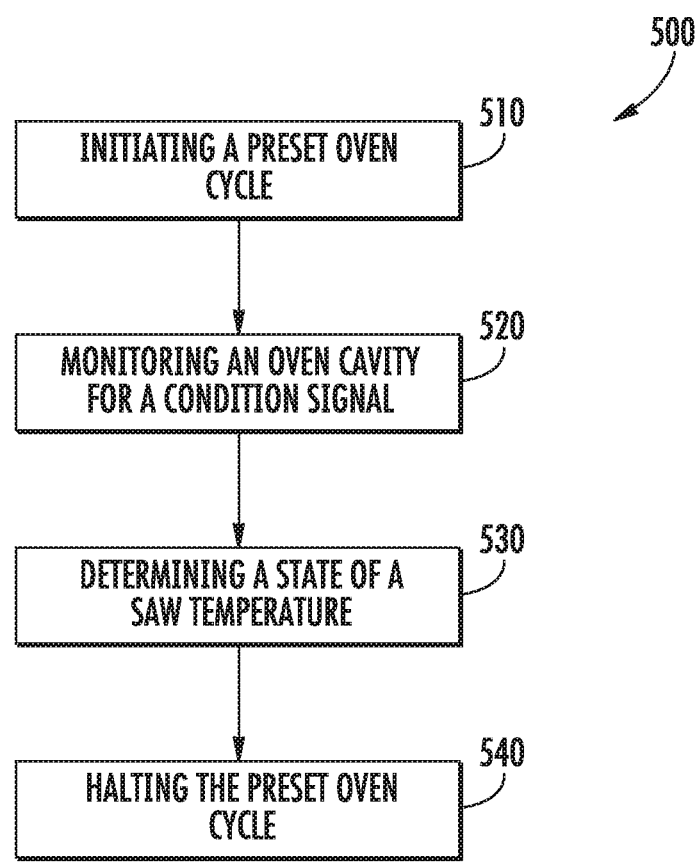
FIG. 5 provides a flow chart illustrating a method of operating an oven appliance according to example embodiments of the present disclosure.
Figure 6:
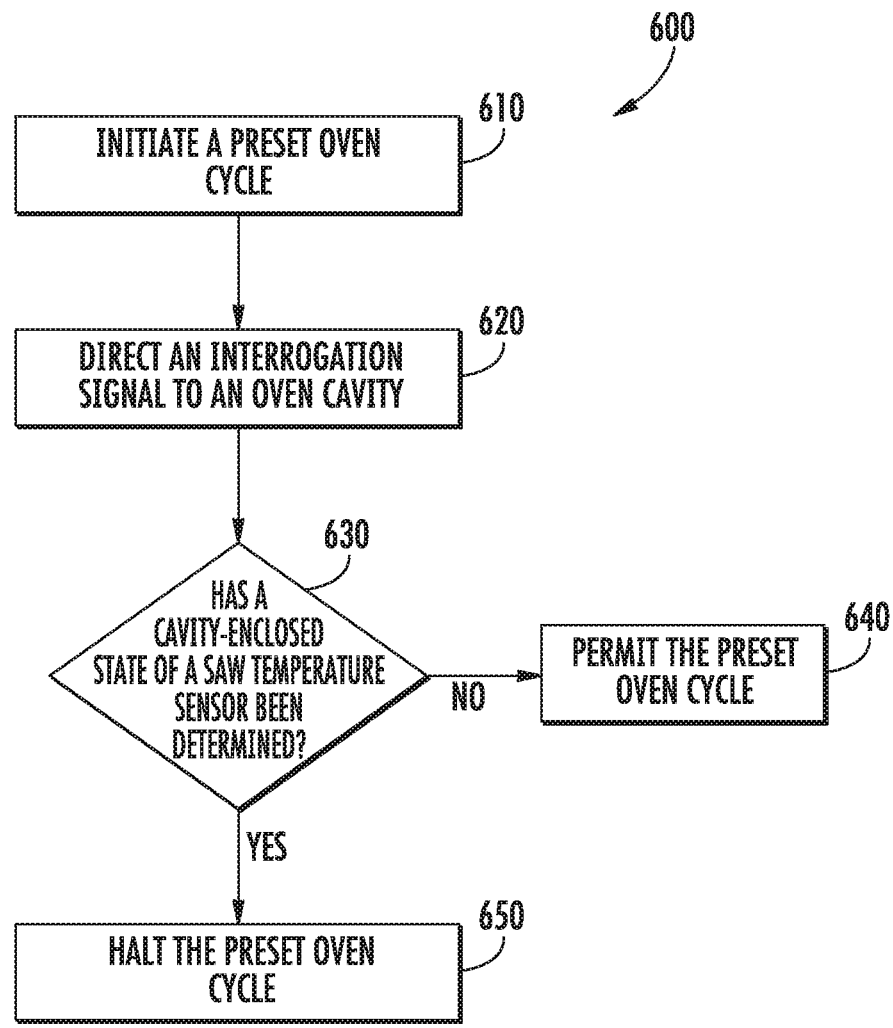
FIG. 6 provides a flow chart illustrating a method of operating an oven appliance according to other example embodiments of the present disclosure.
Figure 7:
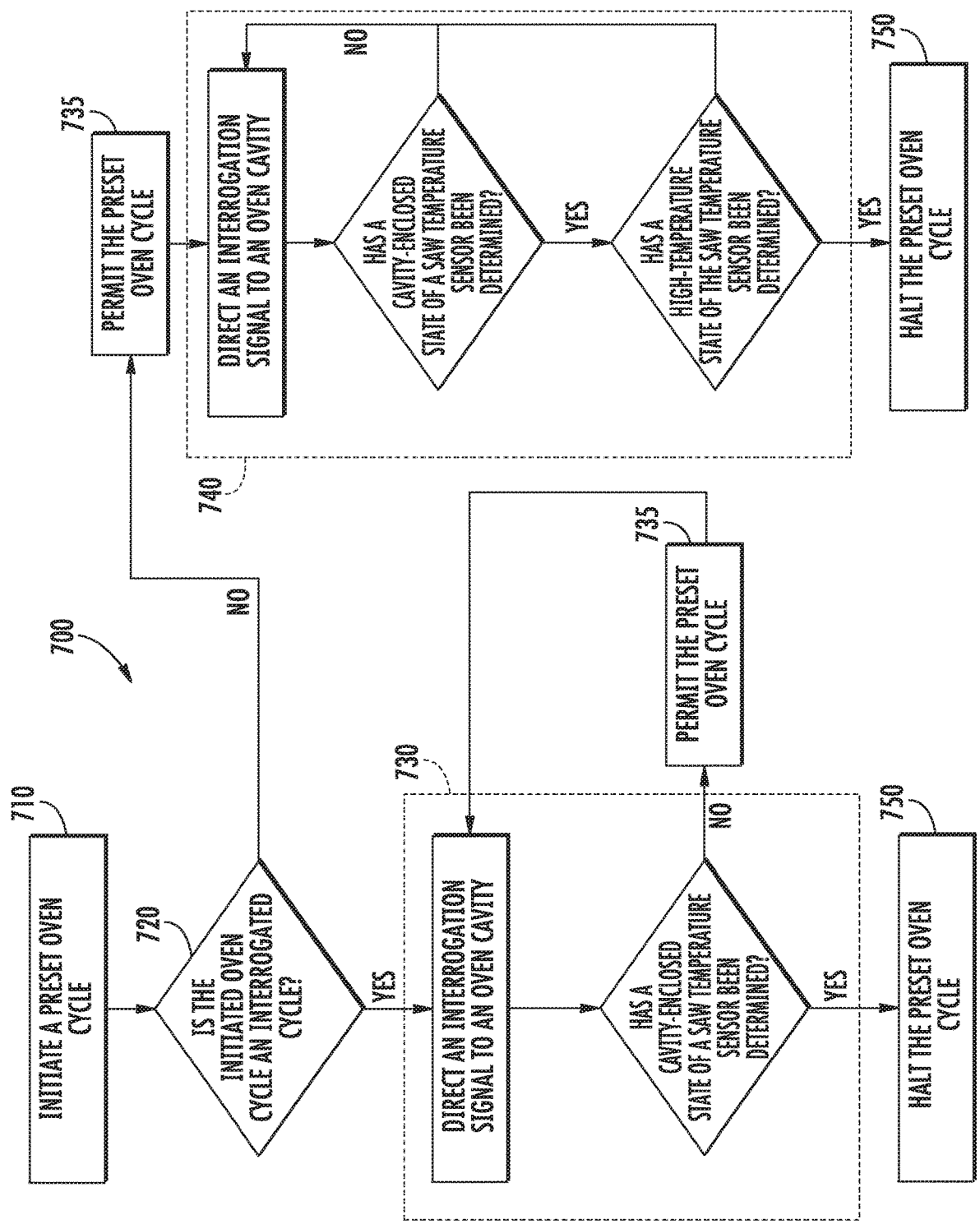
FIG. 7 provides a flow chart illustrating a method of operating an oven appliance according to more example embodiments of the present disclosure.

Turning now to FIGS. 5 through 7, flow diagrams are provided of multiple methods 500, 600, 700, according to example embodiments of the present disclosure. Generally, each of method 500, 600, and 700 provides a method of operating cooking appliance 10 (e.g., as a sensor protection sequence). As described above, the cooking appliance 10 may include a cabinet 12 that defines an oven cavity (such as a cooking chamber 14), an acoustic wave reader 52, and a SAW temperature sensor 54. Each of method 500, 600, and 700 can be performed, for instance, by the controller 50. For example, controller 50 may, as discussed, be in communication with acoustic wave reader 52 (e.g., through electrical coupling) and/or SAW temperature sensor 54 (e.g., through acoustic wave reader 52). Moreover, controller 50 may send signals to, and receive signals from, acoustic wave reader 52 and/or SAW temperature sensor 54. Controller 50 may further be in communication with other suitable components of the appliance 10 to facilitate operation of the appliance 10, generally. FIGS. 5 through 7 depict steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure, except as otherwise indicated.

Turning specifically to FIG. 5, a flow chart is provided for the example method 500. At 510, the method 500 includes initiating a preset oven cycle. For instance, the controller may receive a user input, e.g., at the control panel, indicating the selection of one or more oven cycles. The preset oven cycle any oven cycle, or may be one or more specific cycles. Moreover, the preset oven cycle may be a single temperature setting, or series of actions and/or temperatures. In some embodiments, the preset oven cycle is an oven cleaning cycle. In additional or alternative embodiments, the preset oven cycle is a high-temperature cycle (e.g., a temperature cycle wherein burner elements will be directed to bring the oven cavity to one or more elevated temperatures that exceed a predetermined threshold). In response to the initiation, one or more burner elements may be activated to heat the oven cavity, as described above.

At 520, the method 500 includes monitoring an oven cavity for a condition signal. As an example, 520 may be performed in response to the imitated oven cycle of 510. Monitoring may generally occur through the acoustic wave reader. In some embodiments, the controller directs the acoustic wave reader to transmit an interrogation signal from the acoustic wave reader and into the oven cavity or cooking chamber of the oven appliance. In turn, the acoustic wave reader may transmit one or more interrogation signals, as described above. For instance, a single interrogation signal may be transmitted from acoustic wave reader. Alternatively, a series or plurality of interrogation signals may be transmitted, e.g., as a repeating sequence.

In certain embodiments, 520 includes receiving a condition signal in response to the directed interrogation signal. Specifically, the condition signal may be transmitted to the acoustic wave reader from the SAW temperature sensor when the SAW temperature sensor is disposed within the oven. Alternately, 520 may include failing to receive the condition signal (e.g., within a set amount of subsequent time following transmission of an interrogation signal) when the SAW temperature sensor is disposed outside the oven cavity.

At 530, the method 500 includes determining a state of the SAW temperature sensor. The determination of 530 may be based on the monitoring at 510. Specifically, a determination may be made that the SAW temperature sensor is in a cavity-enclosed state within the oven cavity. In other words, it may be determined that the SAW temperature sensor is present within the oven cavity. Alternately, a determination may be made that the SAW temperature sensor is in a cavity-absent state outside of the cavity. In other words, it may be determined that the SAW temperature sensor is outside of (i.e., not enclosed by) the oven cavity.

Although a single alternated determination of a cavity-enclosed/cavity-absent state is described. It is understood that 530 may determine additional or alternative states. For example, a high-temperature state may be determined. In some such embodiments, 530 includes determining a predetermined temperature limit has been reached or exceeded, e.g., at the SAW temperature sensor, based on a condition signal received at the acoustic wave reader, as described above. Optionally, the predetermined temperature limit may be 250° Celsius.

At 540, the method 500 includes halting the preset oven cycle. Specifically, the preset oven cycle may be halted based on a determined cavity-enclosed state of the SAW temperature sensor within the oven cavity. In other words, the oven may restrict or discontinue certain operations, e.g., heating operations, if it is determined that the SAW temperature sensor is still within the oven cavity. Alternatively, the method 500 may include permitting the preset oven cycle (i.e., allowing the preset oven cycle to continue) based on a determined cavity-absent state of the SAW temperature sensor outside the oven cavity. Operations may thus continue without interruption if it is determined that the SAW temperature sensor is outside of the oven cavity. Additionally or alternatively, the method 500 may include halting the preset oven cycle based on a determined high-temperature state of the SAW temperature sensor above a predetermined temperature limit. As an example, if it is determined that the SAW temperature sensor is within the oven cavity and has reached or exceeded the predetermined temperature limit, the method 500 may restrict or discontinue certain operations, e.g., heating operations. Simultaneous with or subsequent to halting of the oven cycle, a user may be alerted, e.g., via one or more audio/visual alarms.

Turning specifically to FIG. 6, a flow chart is provided for the example method 600. At 610, the method 600 includes initiating a preset oven cycle. For instance, the controller may receive a user input, e.g., at the control panel, indicating the selection of one or more oven cycles. The preset oven cycle may be a single temperature setting, or series of actions and/or temperatures. In some embodiments, the preset oven cycle is an oven cleaning cycle. In additional or alternative embodiments, the preset oven cycle is a high-temperature cycle. In response to the initiation, one or more burner elements may be activated to heat the oven cavity, as described above.

At 620, the method 600 includes directing an interrogation signal to an oven cavity. For instance, an interrogation signal may be directed to transmit from an acoustic wave reader into an oven cavity or cooking chamber, as described above.

At 630, the method includes evaluating whether a cavity enclosed state of the SAW temperature sensor has been reached. In optional embodiments, 630 evaluates if a condition signal has been received at the acoustic wave reader, e.g., in response to the interrogation signal. If the evaluation is that "no," a cavity-enclosed state has not been determined (e.g., no condition signal has been received), the method 600 may continue to 640. If the evaluation is that "yes," a cavity-enclosed state has been determined (e.g., a condition signal has been received), the method 600 may continue to 650.

At 640, the method 600 includes permitting the initiated cycle. For instance, one or more of the burner elements may be activated (or continue to be activated) to generate heat within the oven cavity.

At 650, the method 600 includes halting the preset oven cycle. For instance, the burner elements may be prevented from activating (or deactivated) to stop the generation of heat within the oven cavity. Simultaneous with or subsequent to halting of the oven cycle, a user may be alerted, e.g., via one or more audio/visual alarms.

Turning specifically to FIG. 7, a flow chart is provided for the example method 700. At 710, the method 700 includes initiating a preset oven cycle. For instance, the controller may receive a user input, e.g., at the control panel, indicating the selection of one or more oven cycles. The preset oven cycle may be a single temperature setting, or series of actions and/or temperatures.

At 720, the method 700 may include determining if the initiated oven cycle is an interrogating or interrogated cycle in which oven conditions are predicted to damage a SAW temperature sensor. For instance, the interrogated cycle may be an oven cycle having a temperature setting above a predetermined temperature limit. The subsequent step may depend on whether it is determined that the initiated oven cycle is an interrogated cycle. If "yes," the method 700 may immediately proceed to 730. If "no," the method 700 may proceed to 735 in which the preset oven cycle is permitted.

At 730, the method 700 includes presence monitoring the oven cavity. Specifically, 730 may include directing an interrogation signal to the oven cavity and determining whether the SAW temperature sensor is in a cavity-enclosed state. As illustrated, the SAW temperature sensor may be determined to be in cavity-enclosed state if a condition signal is received at the acoustic wave reader. Optionally, the SAW temperature sensor may be determined not to be in a cavity-enclosed state if no condition signal is received at the acoustic wave reader (e.g., within a set amount of subsequent time after directing the interrogation signal). If a cavity-enclosed state is not determined, the method 700 may include proceeding to 735 before repeating 730. If a cavity-enclosed state is determined, the method 700 may proceed to 750 in which the present oven cycle is halted. Simultaneous with or subsequent to halting of the oven cycle at 750, a user may be alerted, e.g., via one or more audio/visual alarms.

At 740, the method 700 includes extended monitoring for the oven cavity. Specifically, 740 may include directing an interrogation signal to the oven cavity and determining whether the SAW temperature sensor is in a cavity-enclosed state. As illustrated, the SAW temperature sensor may be determined to be in cavity-enclosed state if a condition signal is received at the acoustic wave reader. Optionally, the SAW temperature sensor may be determined not to be in a cavity-enclosed state if no condition signal is received at the acoustic wave reader (e.g., within a set amount of subsequent time after directing the interrogation signal). If "yes," 740 may determine whether a high-temperature state of the SAW temperature sensor has been determined, e.g., based on temperature data determined from a received condition signal.

If the either determination (of the cavity enclosed state or the high-temperature state) is "no," 740 may include repeating the directing of an interrogation signal. If both determinations (of the cavity enclosed state or the high-temperature state) is "yes," the method 700 may proceed to 750 in which the present oven cycle is halted. Simultaneous with or subsequent to halting of the oven cycle, a user may be alerted, e.g., via one or more audio/visual alarms.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an oven appliance comprising a cabinet defining an oven cavity, an acoustic wave reader, and a surface acoustic wave (SAW) temperature sensor, the method comprising:
   initiating a preset oven cycle from a plurality of oven cycles;
   determining the initiated preset oven cycle is an interrogating cycle in which oven conditions are predicted to damage the SAW temperature sensor;
   monitoring the oven cavity for a condition signal in response to the initiated oven cycle and determining the initiated preset oven cycle is an interrogating cycle, the condition signal being transmitted from the SAW temperature sensor to the acoustic wave reader;
   determining a state of the SAW temperature sensor based on the monitoring; and
   halting the preset oven cycle based on a determined cavity-enclosed state of the SAW temperature sensor within the oven cavity,
   wherein the monitoring includes directing an interrogation signal from the acoustic wave sensor to the oven cavity, and
   wherein the monitoring includes receiving the condition signal in response to the directing when the SAW temperature sensor is disposed within the oven cavity.

2. The method of claim 1, further comprising:
   permitting the preset oven cycle based on a determined cavity-absent state of the SAW temperature sensor outside the oven cavity.

3. The method of claim 1, wherein the monitoring includes failing to receive the condition signal when the SAW temperature sensor is disposed outside the oven cavity.

4. The method of claim 1, wherein monitoring includes repeating the directing of an interrogation signal.

5. The method of claim 1, wherein the preset oven cycle is an oven cleaning cycle.

6. The method of claim 1, wherein the preset oven cycle is a high-temperature cycle.

7. An oven appliance comprising:
   a cabinet defining an oven cavity;
   a heat source disposed within the oven cavity;

an acoustic wave reader in communication with the oven cavity;

a surface acoustic wave (SAW) temperature sensor receivable within the oven cavity; and a controller in operable communication with the acoustic wave reader, the controller being configured to initiate a sensor protection sequence, the sensor protection sequence comprising:

initiating a preset oven cycle of the heat source from a plurality of oven cycles, determining the initiated preset oven cycle is an interrogating cycle in which oven conditions are predicted to damage the SAW temperature sensor, monitoring the oven cavity for a condition signal in response to the initiated oven cycle and determining the initiated preset oven cycle is an interrogating cycle, the condition signal being transmitted from the SAW temperature sensor to the acoustic wave reader, determining a state of the SAW temperature sensor based on the monitoring, and halting the preset oven cycle based on a determined cavity-enclosed state of the SAW temperature sensor within the oven cavity, wherein the monitoring includes directing an interrogation signal from the acoustic wave sensor to the oven cavity, and wherein the monitoring includes receiving the condition signal in response to the directing when the SAW temperature sensor is disposed within the oven cavity.

8. The oven appliance of claim 7, wherein the sensor protection sequence further comprises permitting the preset oven cycle based on a determined cavity-absent state of the SAW temperature sensor outside the oven cavity.

9. The oven appliance of claim 7, wherein the monitoring includes failing to receive the condition signal when the SAW temperature sensor is disposed outside the oven cavity.

10. The oven appliance of claim 7, wherein monitoring includes repeating the directing of an interrogation signal.

11. The oven appliance of claim 7, wherein the preset oven cycle is an oven cleaning cycle.

12. The oven appliance of claim 7, wherein the preset oven cycle is a high-temperature cycle.

* * * * *